Nov. 24, 1953  J. C. TURNBULL  2,659,966
METHOD OF FABRICATING WELDED GIRTH JOINTS
Filed April 9, 1949
*Fig. 1.*  *Fig. 4.*
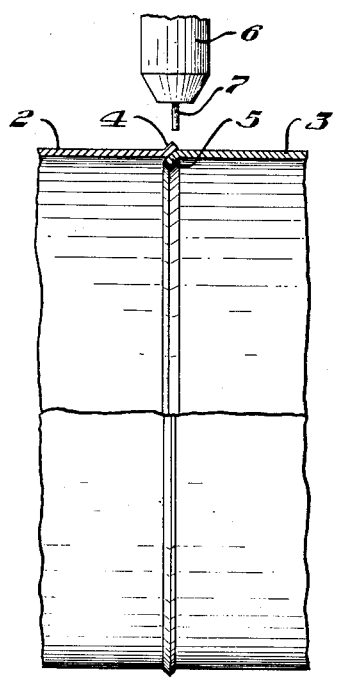
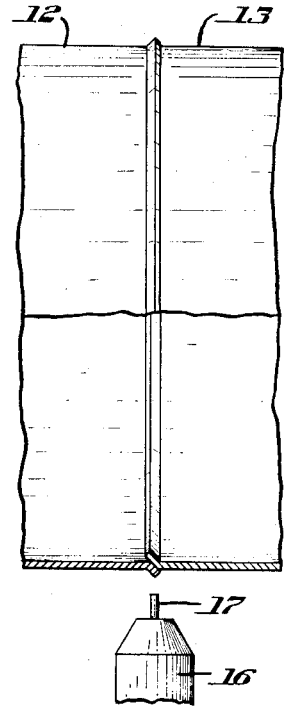
*Fig. 2.*  *Fig. 5.*  *Fig. 7.*
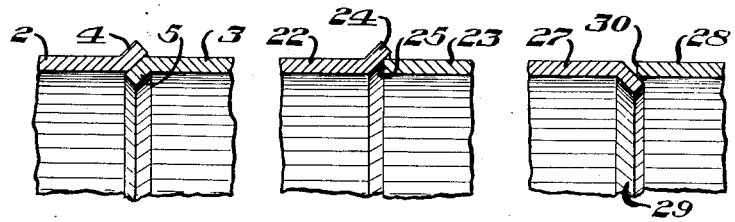
*Fig. 3.*  *Fig. 6.*  *Fig. 8.*
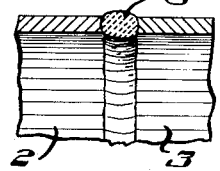
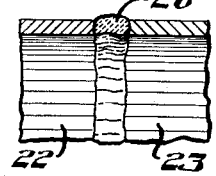
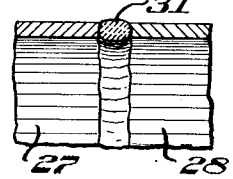
INVENTOR
JAMES CORYELL TURNBULL
by Hoopes, Leonard & Hern,
his attorneys.

Patented Nov. 24, 1953

2,659,966

UNITED STATES PATENT OFFICE 2,659,966

METHOD OF FABRICATING WELDED GIRTH JOINTS

James Coryell Turnbull, Oakmont, Pa., assignor to Scaife Company, Oakmont, Pa., a corporation of Pennsylvania Application April 9, 1949, Serial No. 86,570

7 Claims. (Cl. 29—358)

This invention relates to the fabrication of welded girth joints. It has to do with an improved method of fabricating welded girth joints whereby the work is facilitated, more accurate relative disposition of the elements being joined is obtained and a superior weld is produced.

A welded girth joint is a joint formed by welding between two tubular metal elements as in the manufacture of tanks. In fabrication of such a joint the elements must be disposed in proper relation with their ends in contact, whereupon the ends are welded together. The elements must be supported by means remote from the point of welding. It is extremely difficult to support plain tubular elements in proper relationship for welding without the provision of elaborate positioning and clamping means. It has been proposed to deform the end of one element to lie parallel to the end of the other either internally or externally, thereby forming a telescoping joint whereby the ends of the elements are relatively positioned. While such a joint relatively positions the ends of the elements it has numerous disadvantages. More metal than is necessary is employed because there is a double thickness of metal at the joint. The weld may be out of line with the walls of the elements which sets up stresses which weaken the structure. Further, gases formed during welding are imprisoned within the joint resulting in a porous and, hence, weak weld.

Other proposals have been made looking toward improving the art of fabricating welded girth joints but all of them have been found wanting in one or more respects.

My invention obviates these advantages of the prior methods. I relatively shape the co-operating ends of the tubular elements to be welded together so that the elements center each other yet without employing a great excess of metal and without imprisoning gases formed during welding. No intricate or complicated mechanism for supporting and positioning the elements is required. They need merely be roughly aligned with each other and then pressed together whereupon they are self-centering and ready for welding. The structure is such that the weld is in alignment with the walls of the co-operating elements thus eliminating stresses caused by welds which are disposed to one side or the other of the joint.

I provide a method of fabricating a welded girth joint comprising forming two generally tubular metal elements of the same cross-sectional shape and dimensions, forming out of the metal of at least one of the elements at an end thereof a flange extending generally endwise of said element at an acute angle to the metal of said element adjacent the flange, assembling the elements end to end with said flange in engagement with the other element whereby to center the elements relatively to each other while permitting free escape of gases formed during welding and welding together the thus assembled elements. Each of the elements may have at an end thereof a flange extending generally endwise of said element at an acute angle to the metal of said element adjacent the flange and with one of the flanges extending inwardly of its element and the other of the flanges extending outwardly of its element. The ends of the elements are assembled so that the elements are readily and accurately centered by the flange or flanges. If both elements are flanged the flanges lie in surface-to-surface engagement with each other. If only one element is flanged the end surface of the other element engages the flange. If only one element is flanged the flange may extend either inwardly or outwardly; if both elements are flanged one flange should extend inwardly and the other outwardly. In any case the elements are relatively self-centering. When the ends of the elements are in abutting relationship the walls thereof are in longitudinal alignment. The weld is likewise in longitudinal alignment with the walls so that stresses due to eccentricity of the weld or of either member relatively to the other are obviated.

Other details, objects and advantages of the invention will become apparent as the following description of certain present preferred methods of practicing the same proceeds.

In the accompanying drawings I have illustrated certain present preferred methods of practicing the invention, in which:

Figure 1 is a fragmentary diagrammatic view partly in elevation and partly in cross section showing tubular elements assembled ready for welding;

Figure 2 is a fragmentary cross-sectional view to enlarged scale of a portion of the structure shown in Figure 1;

Figure 3 is a view similar to Figure 2 showing the finished weld;

Figure 4 is a view similar to Figure 1 showing the welding electrode positioned beneath the joint instead of above the joint as in Figure 1;

Figure 5 is a view similar to Figure 2 showing a modified construction having an outwardly extending flange on one element and no flange on the other element.

Figure 6 is a view similar to Figure 3 showing the finished weld obtained by welding together the elements shown in Figure 5;

Figure 7 is a view similar to Figures 2 and 5 showing a further modified construction having an inwardly extending flange on one element and no flange on the other element; and Figure 8 is a view similar to Figures 3 and 6 showing the finished weld obtained by welding together the elements shown in Figure 7.

Referring now more particularly to the drawings, Figure 1 shows two tubular metal elements 2 and 3 of the same cross-sectional shape and dimensions which are to be peripherally welded together to form therebetween a welded girth joint. The tubular members 2 and 3 may be of steel or other metal suitable for the purpose and they may constitute portions of a tank or conduit. In preparation for assembly and welding each of the members 2 and 3 is flanged at the end thereof which is to co-operate with the other member. In the structure shown in Figure 1 the member 2 is outwardly flanged at 4 and the member 3 is inwardly flanged at 5. Each of the flanges 4 and 5 extends generally endwise of the element of which it is a part at an acute angle to the metal of that element adjacent the flange. The flanges 4 and 5 are shown as each extending at an angle of about 45° to the element wall. The flanges may be short, normally not over about twice the thickness of the metal.

When the elements 2 and 3 have been flanged as above described they are brought together with the flanged ends in contact. The flanges 4 and 5 co-operate with each other as shown in Figure 2 to rapidly and accurately center the elements. All that is necessary to center the elements relatively to each other is to assemble them with the flanges 4 and 5 in surface-to-surface engagement as shown in Figures 1 and 2 and press the elements axially together. They may be mounted so that the assembly may be rotated about the common axis of the elements.

The elements centered relatively to each other as above described are welded together at the joint. The welding may be accomplished in various ways. In Figure 1, I show an arc-welding head 6 having an electrode 7 as of tungsten, an arc being drawn between the work and the electrode and inert gas being supplied to the weld about the electrode through the head 6 as well known in the art. During welding the assembled elements 2 and 3 may be rotated about their common axis. The metal at the flanges fuses into a weld which is in axial alignment with the elements. The weld is shown diagrammatically at 8 in Figure 3.

Figure 4 shows elements 12 and 13 which may be identical with the elements 2 and 3 welded together in similar manner by a welding head 16 having an electrode 17. The only difference between the showings of Figures 1 and 4 is that in Figure 1 the welding is done at the top of the joint while in Figure 4 the welding is done at the bottom of the joint.

Figure 5 shows a modified structure in which only one of the tubular elements is flanged. In Figure 5 tubular elements 22 and 23 are assembled for welding, the element 22 only being outwardly flanged. That element has a flange 24 extending generally endwise thereof and outwardly at an acute angle. The element 23 has its end surface 25 abutting the flange 24 whereby the elements 22 and 23 are centered relatively to each other. While the flange 24 is shown in Figure 5 as extending outwardly of the structure it may extend inwardly with the same result so far as the integrity and strength of the weld are concerned. See Figures 7 and 8 to be described below. The assembled members are welded in the same manner as above explained, the finished weld being shown at 26 in Figure 6.

Figure 7 shows another modified structure in which only one of the tubular elements is flanged. In Figure 7 tubular elements 27 and 28 are assembled for welding, the element 27 only being inwardly flanged. That element has a flange 29 extending generally endwise thereof and inwardly at an acute angle. The element 28 has its end surface 30 abutting the flange 29 whereby the elements 27 and 28 are centered relatively to each other. The assembled members are welded in the same manner as above explained, the finished weld being shown at 31 in Figure 8.

The structure of Figures 5 and 6 in which one element is outwardly flanged and the other is unflanged has one advantage over the structure of Figures 7 and 8 in which one element is inwardly flanged and the other is unflanged. When the flange extends outwardly a weld is formed which is sufficiently smooth on the outside and whose exterior is sufficiently continuous with the outer surfaces of the elements to have a satisfactory appearance without employing filler metal. Such a weld may have a slight channel on the inside of the structure but that channel is of no consequence because it is invisible from without. Despite the presence of the inside channel the weld is of full strength and fully satisfactory in use.

When one element has an inward flange and the other is unflanged as in Figures 7 and 8 it may be desirable to employ some filler metal to insure desirable smoothness and appearance at the exterior. Without the filler metal there may be a slight annular inward depression in the weld at the exterior of the structure which might be considered undesirable from the standpoint of appearance although the strength of the weld is adequate whether or not the depression is filled in with filler metal.

An advantage of my joint is realized through the cleansing action of the arc. Gases formed during welding are not imprisoned within the joint but are left free for escape so that a non-porous, solid, compact weld is formed.

Thus my invention solves the problems heretofore existing in the fabrication of welded girth joints. Intricate and expensive mechanism for supporting and relatively positioning the elements is rendered unnecessary. The elements are self-centering. They need merely be approximately aligned and then pressed together and they automatically center each other. Wastage of material as in the formation of a telescoping joint between the elements is avoided. The gases formed during welding are not imprisoned but are freely vented so that a compact, strong weld is formed. The weld is in alignment with the elements and the elements are in alignment with each other, obviating stresses due to eccentricity. The net result is the formation of a superior structure at greatly reduced cost.

While I have illustrated and described certain present preferred methods of practicing the invention it is to be distinctly understood that the invention is not limited thereto but may be otherwise variously practiced within the scope of the following claims.

I claim:

1. A method of fabricating a welded girth joint comprising forming two generally tubular metal elements of the same cross-sectional shape and dimensions, forming out of the metal of at least one of the elements at an end thereof a flange extending generally endwise of said element at an acute angle to the metal of said element adjacent the flange, assembling the elements end to end with said flange in engagement with the other element at a portion of said flange removed from the extremity thereof whereby to center the elements relatively to each other while permitting free escape of gases formed during welding and fusing together the thus assembled elements in longitudinal alignment with both elements so that the welded joint formed by said fusing and both elements are in longitudinal alignment.

2. A method of fabricating a welded girth joint comprising forming two generally tubular metal elements of the same cross-sectional shape and dimensions, forming out of the metal of each of the elements at an end thereof a flange extending generally endwise of said element at an acute angle to the metal of said element adjacent the flange and with one of said flanges extending inwardly of its element and the other of said flanges extending outwardly of its element, assembling the elements end to end with said flanges in engagement whereby to center the elements relatively to each other while permitting free escape of gases formed during welding and fusion welding together the thus assembled elements in longitudinal alignment with both elements so that the welded joint and both elements are in longitudinal alignment.

3. A method of fabricating a welded girth joint comprising forming two generally tubular metal elements of the same cross-sectional shape and dimensions, forming out of the metal of at least one of the elements at an end thereof a flange extending generally endwise of said element at an acute angle to the metal of said element adjacent the flange, assembling the elements end to end with said flange in engagement with the other element at a portion of said flange removed from the extremity thereof whereby to center the elements relatively to each other while permitting free escape of gases formed during welding and fusion welding a joint between the elements in longitudinal alignment with both thereof.

4. A method of fabricating a welded girth joint comprising forming two generally tubular metal elements of the same cross-sectional shape and dimensions, forming out of the metal of one of the elements at an end thereof a flange extending generally endwise and inwardly of said element at an acute angle to the metal of said element adjacent the flange, forming out of the metal of the other of the elements at an end thereof a flange extending generally endwise and outwardly of said element at an acute angle to the metal of said element adjacent the flange, assembling the elements end to end with said flanges in surface-to-surface engagement whereby to center the elements relatively to each other while permitting free escape of gases formed during welding and fusion welding together the thus assembled elements in longitudinal alignment with both elements so that the welded joint and both elements are in longitudinal alignment.

5. A method of fabricating a welded girth joint comprising forming two generally tubular metal elements of the same cross-sectional shape and dimensions, forming out of the metal of one only of the elements at an end thereof a flange extending generally endwise of said element at an acute angle to the metal of said element adjacent the flange, assembling the elements end to end with said flange in engagement with the end surface of the other element whereby to center the elements relatively to each other while permitting free escape of gases formed during welding and fusion welding together the thus assembled elements in longitudinal alignment with both elements so that the welded joint and both elements are in longitudinal alignment.

6. A method of fabricating a welded girth joint comprising forming two generally tubular metal elements of the same cross-sectional shape and dimensions, forming out of the metal of one only of the elements at an end thereof a flange extending generally endwise and outwardly of said element at an acute angle to the metal of said element adjacent the flange, assembling the elements end to end with said flange in engagement with the end surface of the other element whereby to center the elements relatively to each other while permitting free escape of gases formed during welding and fusion welding together the thus assembled elements in longitudinal alignment with both elements so that the welded joint and both elements are in longitudinal alignment.

7. A method of fabricating a welded girth joint comprising forming two generally tubular metal elements of the same cross-sectional shape and dimensions, forming out of the metal of one only of the elements at an end thereof a flange extending generally endwise and inwardly of said element at an acute angle to the metal of said element adjacent the flange, assembling the elements end to end with said flange in engagement with the end surface of the other element whereby to center the elements relatively to each other while permitting free escape of gases formed during welding, fusion welding together the thus assembled elements so that the welded joint and both elements are in longitudinal alignment and during welding applying filler metal to the outside of the weld.

JAMES CORYELL TURNBULL.

References Cited in the file of this patent

UNITED STATES PATENTS

| Number | Name | Date |
|---|---|---|
| 1,706,393 | Fay | Mar. 26, 1929 |
| 1,706,403 | Fay | Apr. 29, 1930 |
| 1,750,010 | King | Mar. 11, 1930 |
| 1,756,403 | Thomson | Apr. 29, 1930 |
| 1,810,091 | Siegle | June 16, 1931 |
| 1,935,063 | Scott | Nov. 14, 1933 |
| 1,915,913 | Anderson | June 27, 1933 |
| 1,915,914 | Anderson | June 27, 1933 |
| 2,050,326 | Hopkins | Aug. 11, 1936 |
| 2,362,505 | Smith | Nov. 14, 1944 |
| 2,551,484 | Branning | May 1, 1951 |

FOREIGN PATENTS

| Number | Country | Date |
|---|---|---|
| 427,912 | Great Britain | May 2, 1935 |

OTHER REFERENCES

Weld. Encyclopedia, 12th ed., p. 290. Pub. by The Weld. Eng. Pub. Co., New York, N. Y. Copy in Div. 14.